United States Patent Office 2,991,657
Patented July 11, 1961

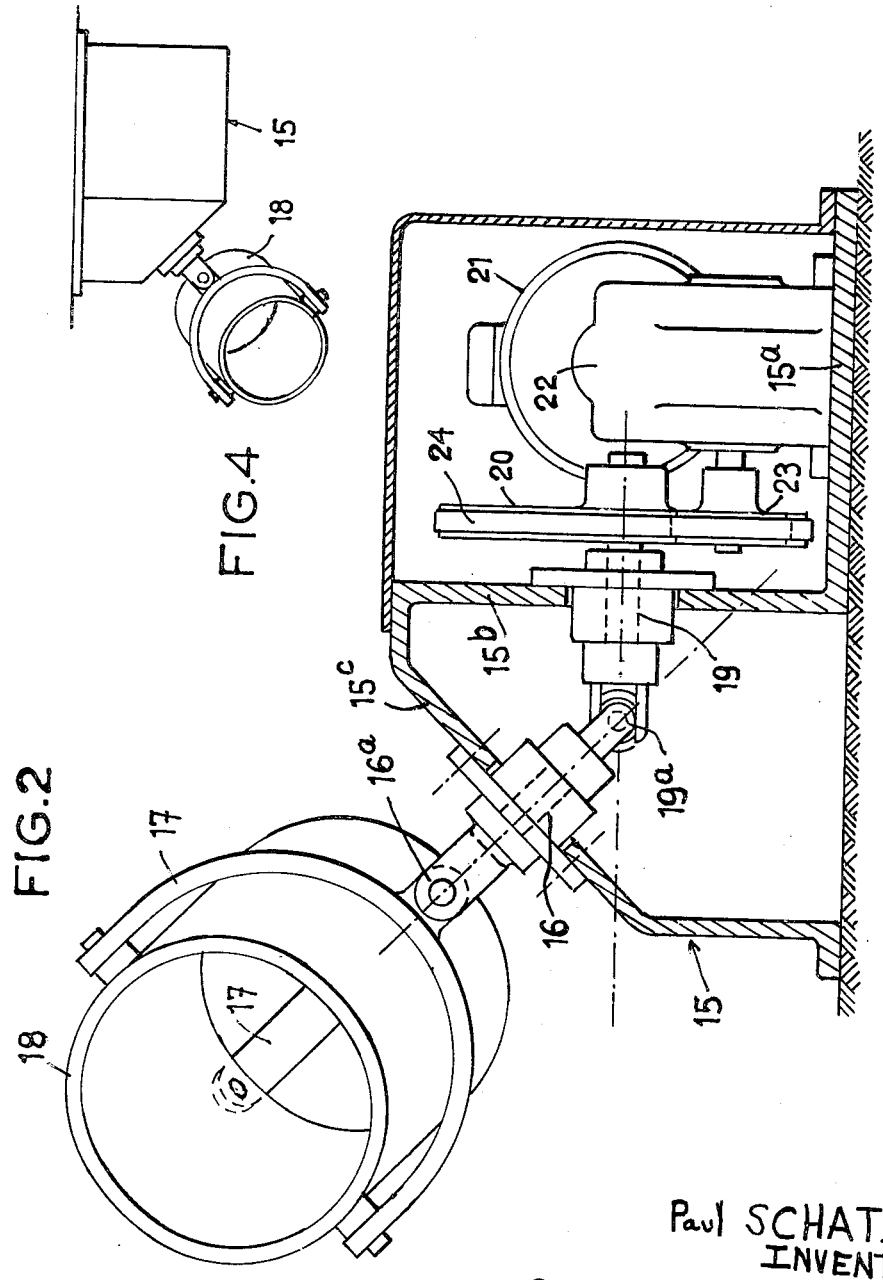

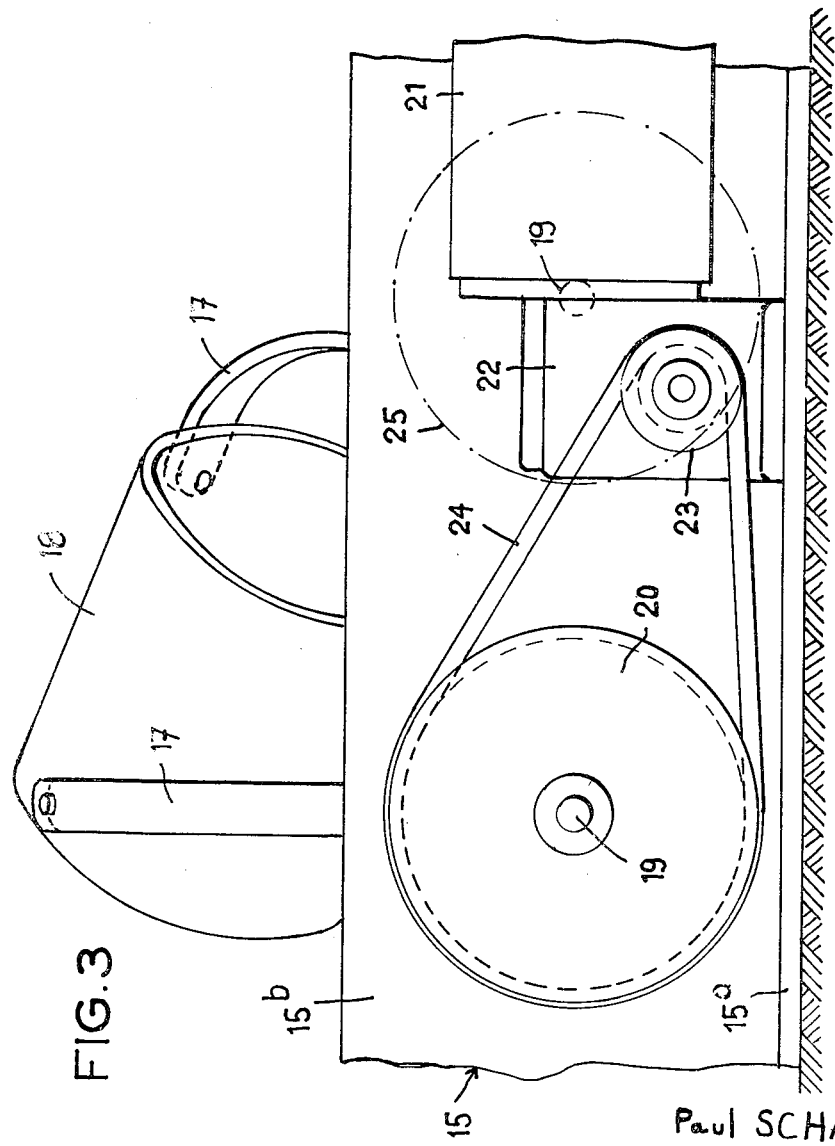

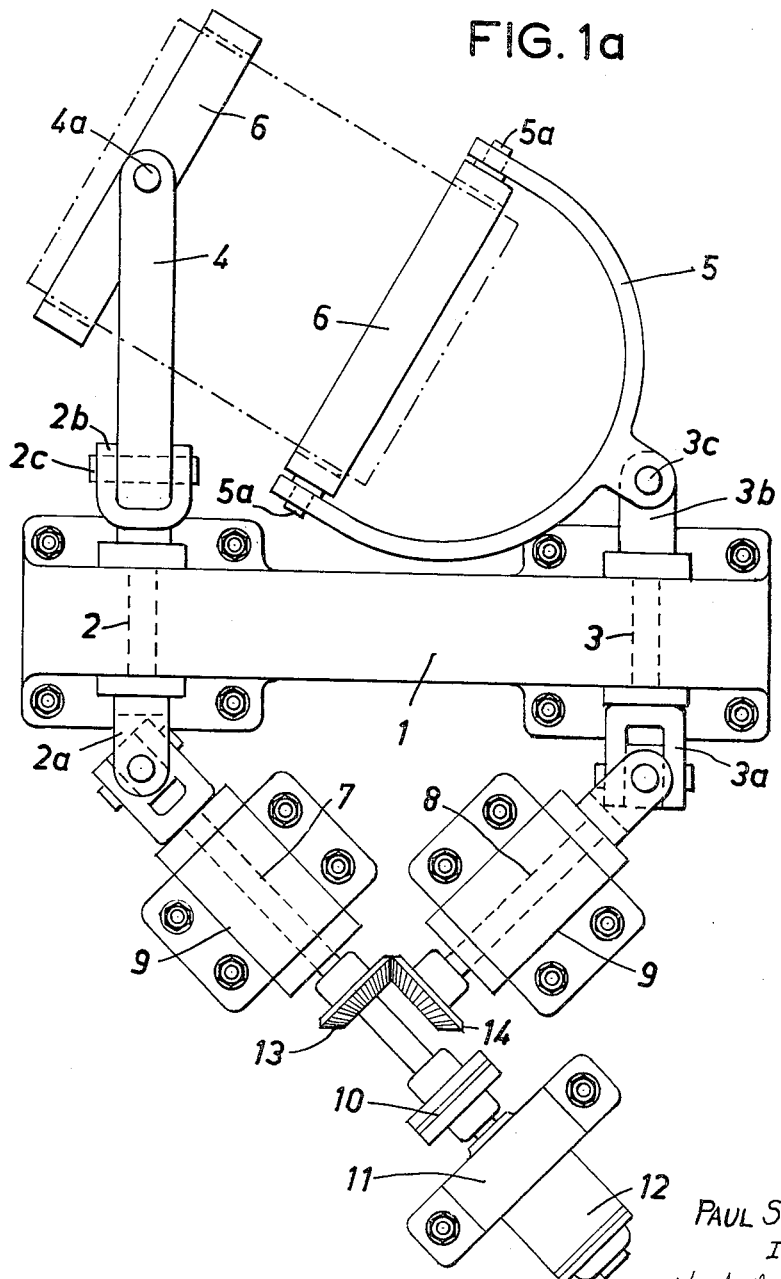

2,991,657
ARRANGEMENT FOR PRODUCING A ROTARY AND WOBBLING MOVEMENT OF A PART THROUGH THE AGENCY OF AN INVERTIBLE KINEMATIC CHAIN
Paul Schatz, Raingartenweg 11, Dornach, Switzerland
Filed Feb. 2, 1959, Ser. No. 790,572
Claims priority, application Switzerland Feb. 6, 1958
8 Claims. (Cl. 74—1)

The present invention has for its object an arrangement for producing a rotary and wobbling movement of a part through the agency of an invertible kinematic chain; said arrangement is of the type disclosed in applicant's prior Swiss Patent No. 216,760 filed on February 5, 1939, and in his corresponding U.S. Patent 2,302,804, dated November 24, 1942. Said prior arrangement includes two guiding members pivotally secured to the part or article to be set in movement, said members being, furthermore, each connected by means of pivotal connection with one end of a corresponding auxiliary shaft, while the axes of said pivotal connections lie in a common plane, as characteristic for arrangements of this type.

The novelty and the difficulty of such arrangements reside in the fact that the two auxiliary shafts to be driven must rotate in a non-uniform manner if it is desired to obtain a regular alternating distribution of the accelerations and decelerations required during the cycle of movements. If this condition is not satisfied, the body to be moved moves in an irregular manner which leads, in the case of machines of the type considered, to an objectionable modification in the operation of such machines and to a speedy wear of the bearings.

It is possible to solve this problem of the driving of the shafts through equilibrating means such as differential gears, worm gears provided with worms adapted to be shifted between compression springs, elastic couplings, hydraulic or pneumatic means or again electric motors controlled electronically and providing pulses of alternating directions. All these solutions lead to a more or less considerable elastic shifting of the elements to be driven. The uniform oscillation of the machine cannot be positively provided by the driving gear and is obtained through the natural oscillation of the system.

The driving means referred to have a comparatively poor yield and require an intricate execution so that they are subjected to a comparatively speedy wear. The parts need properly designed lubricating auxiliaries with corresponding sealing means, so that they are subject to disturbance and are very expensive.

Now, the invention discloses an arrangement of the above-mentioned type in which the control mechanism produces, in a controlled manner, the required accelerations and decelerations distributed alternatingly on the two auxiliary shafts to be driven, starting from a driving element rotating at a uniform speed.

The alternating increase and decrease of the number of revolutions of the reversible or invertible pivotal link system known per se follows the rule according to which the products of the tangents of the rotary angles of the auxiliary shafts to be driven is constant and equal to 2.

The driving mechanism according to the invention achieves this result through the fact that at least one of the said auxiliary shafts is actuated by a driving shaft through the agency of a Cardan joint, each driving shaft forming an angle of 45° with the extension of the axis of the auxiliary shaft driven by it. Furthermore, the axis of the pivotal joint of each auxiliary shaft forms with the axis of the element of the Cardan joint at the other end of said auxiliary shaft an angle which is the complement of the sloping angle of the Cardan plane, i.e. the plane passing through the cooperating driving and auxiliary shafts with reference to the plane passing through the two auxiliary shafts. In case these two planes coincide and said sloping angle is thus equal to zero, the axis of the pivotal joint forms an angle of 90° with the axis of the corresponding section of the Cardan joint. If, in contradistinction, said Cardan plane is perpendicular to the plane passing through the two auxiliary shafts, the angle between the two above-mentioned axes is equal to zero which means that these two axes extend in parallelism with each other.

In the accompanying drawings are illustrated two embodiments of the object of the invention. In said drawings:

FIG. 1a is a plan view of the first embodiment with the forked pivoting members rotated 90° from the positions shown in FIG. 1.

FIG. 2 shows the arrangement according to the second embodiment in lateral view, certain parts thereof being shown cross-sectionally.

FIG. 3 is a view from the rear of the arrangement illustrated in FIG. 2, in which certain parts are shown as torn off.

FIG. 4 shows again the same arrangement but fitted otherwise than in FIG. 2.

Figure 1:
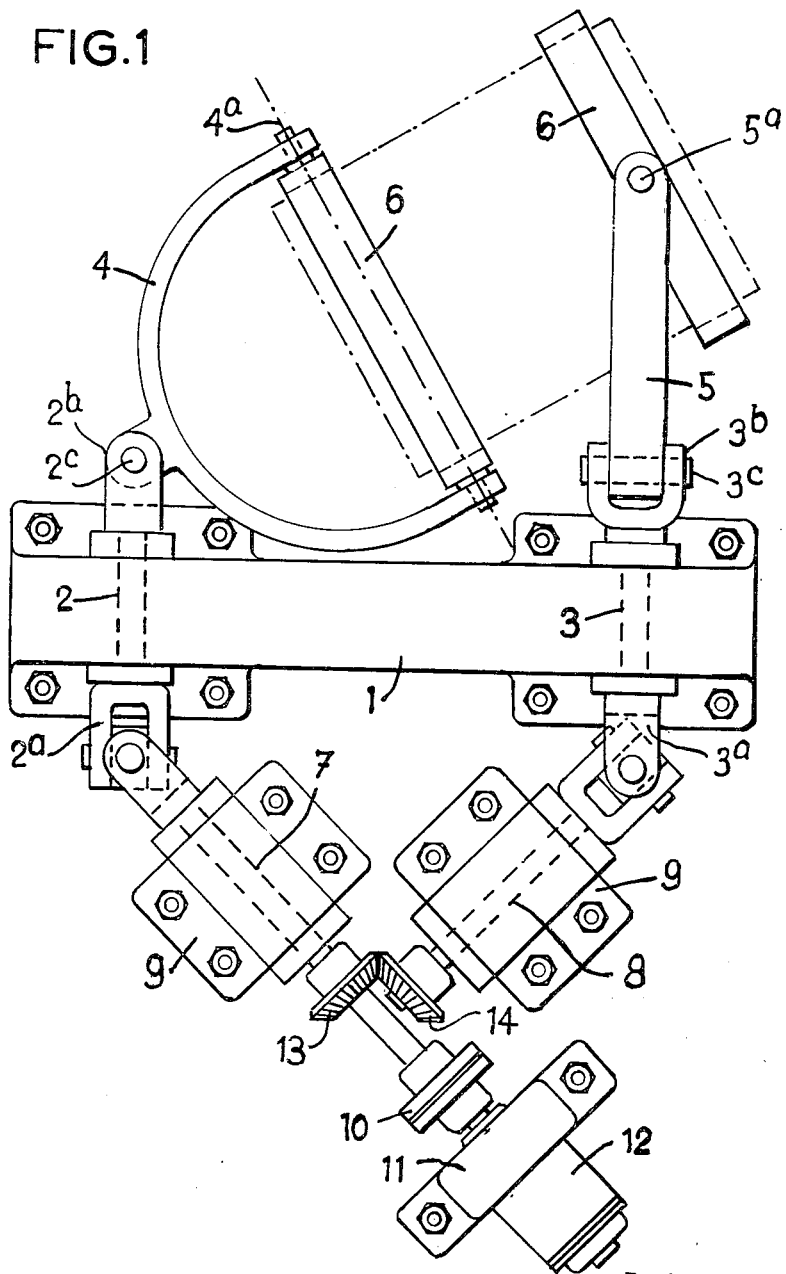
FIG. 1 is a plan view of an arrangement according to the first embodiment.

The arrangement according to FIG. 1 includes a support 1 in which are revolubly mounted two parallel auxiliary shafts 2 and 3. These two auxiliary shafts are connected each by means of pivotal connections or journals 2b and 3b with corresponding forked pivoting members 4 and 5. It should be remarked in this respect that the pivotal axes 2c and 3c of the journals 2b and 3b lie in a common plane. The two pivoting members 4 and 5 are pivotally connected in their turn through their forked ends with two annular carrier members 6, the pivotal axes 4a and 5a provided at the ends of each of the forked pivoting members lie, as is customary for such pivotal systems, in two planes lying orthogonally with reference to each other and they are also at right angles with reference to the corresponding pivotal axes 2c and 3c.

It is possible to use, as a connecting member between these two annular supports 6 a cylindrical mixing container fitted and secured in said annular supports. The two auxiliary shafts 2 and 3 are driven by two driving shafts 7 and 8 carried in the supports or bearings 9 to rotate in a uniform manner therein. Said driving shafts form together a V, and each of them lies at 45° with reference to the extension of the axis of the corresponding auxiliary shaft 2 or 3. The connection between said driving shafts and the auxiliary shafts is ensured by Cardan joints.

It is of particular importance for the axis of the pivotal connection 2b or 3b to be shifted with reference to the axis of the corresponding Cardan joint 2a or 2b by an angle which is a complement of the sloping angle of the Cardan joint, i.e. of the angle between the plane passing through the shafts 2 and 7 (or 3 and 8) and the plane passing through the two auxiliary shafts 2 and 3. In the example illustrated, these planes coincide, so that said sloping angle is equal to zero, while the complementary angle considered is equal to 90°. Consequently, the axes of the journals 2b and 3b are shifted by 90°, with reference to the axes of the Cardan elements 2a and 3a. The driving shraft 7 extends on the side of the support 9 facing away from the Cardan joint and it is connected through a coupling 10 and a speed-reducing gear 11 with the shaft of a driving motor 12. To said extension of the driving shaft 7 is keyed a bevel gear 13 meshing with another bevel gear 14 carried by the corresponding end of the driving shaft 8. The two driving shafts 7 and 8 are driven thus at the same speed and in opposite directions by the same motor. If required, the two driving shafts 7 and 8 may also be arranged in parallelism with each other and be driven also in opposite directions through suitable driving means.

In both cases, the uniform rotary movements of the two driving shafts 7 and 8 are transmitted through the Cardan joints to the auxiliary shafts. Thus, the two auxiliary shafts are subjected selectively through the arrangement of the Cardan joints at 90° from each other and through the angular spacing of the driving shafts which forms an angle of 45° with the axes of the corresponding driving shafts 2 and 3, to acceleration at the rhythm of the alternating accelerations and decelerations to which the elements 4, 5 and 6 forming the pivotal system are to be subjected during operation. In the above-disclosed example, both auxiliary shafts 2 and 3 are driven positively. It would however be quite possible to provide the drive of only one of the Cardan joints under conditions otherwise similar for the latter.

The arrangement according to FIGS. 2 and 3 includes a support 15 with a horizontal pedestal 15a and it also includes a carrier wall 15b perpendicular to the pedestal and an oblique carrier wall 15c forming an angle of 45° with the carrier wall 15b. In the oblique carrier wall 15c are fitted in a manner similar to that disclosed in the example illustrated in FIG. 1 two parallel auxiliary shafts 16 extending perpendicularly to said carrier wall 15c. To the outer ends of the two auxiliary shafts 16 are secured further forked guiding members 17 through the agency of the journals 16a. The ends of said guiding members are pivotally connected with the hollow cylindrical body 18, to which the rotary and wobbling movements are to be applied. These two auxiliary shafts 16 are connected through Cardan joints with two parallel horizontal driving shafts 19 (FIG. 3), which latter are revolubly carried by the vertical carrier wall 15b. One of these two horizontal driving shafts 19 is driven, through the agency of an arrangement including a trapezoidal belt and cooperating pulleys, one of the grooved pulleys 20 being shown as fitted over the corresponding end of said driving shaft. The drive of the other, smaller grooved pulley 23 is performed through a motor 21 and a speed reducer 22, the two pulleys being interconnected by the belt 24. On the corresponding end of the other horizontal driving shaft 19 is provided advantageously a fly wheel shown diagrammatically at 25 in FIG. 3 by a circular dot-and-dash line. If required, it is possible to cut out this second driving shaft and, consequently, the corresponding Cardan joint.

In a manner corresponding to the example illustrated in FIG. 1, the angle between the axis of the journal 16a at the upper end of each auxiliary shaft 16 and the axis 19a of the section of the Cardan joint at the lower end of the same auxiliary shaft is equal to the complement of the sloping angle of the Cardan plane passing through the two pivotally interconnected shafts 16 and 19. Said Cardan plane is, in the case illustrated, perpendicular to the plane passing through the two auxiliary shafts. The complementary angle with reference to said sloping angle of 90° is consequently equal to zero. Thereby, the angular shifting between the two axes considered 16a and 19a is equal also to zero, so that said axes are parallel with each other. The arrangement according to FIGS. 2 and 3 may, if desired, also be mounted in the suspended position illustrated in FIG. 4.

It has been found surprisingly that the arrangement according to the invention is particularly suitable for the execution of seamless hollow parts, in particular of seamless hollow spheres through a centrifugal casting method.

What I claim is:

1. An arrangement for making a member execute a rotary and wobbling movement through a reversible kinematic chain, comprising two forked guides pivotally carrying between their forked ends the said first-mentioned member, two auxiliary shafts each pivotally carrying a forked guide at the middle portion of said forked guide, at least one driving shaft, a Cardan joint pivotally connecting each driving shaft with the corresponding auxiliary shaft, stationary means carrying each auxiliary shaft and each driving shaft to make each driving shaft form an angle of 45° with the axis of the corresponding auxiliary shaft, the pivotal axes at the ends of each auxiliary shaft associated with the guide and with the Cardan joint respectively forming an angle which is the complement of the sloping angle formed by the Cardan plane defined by the axes of the cooperating driving and auxiliary shafts, with the plane defined by the two auxiliary shafts.

2. An arrangement for making a member execute a rotary and wobbling movement through a reversible kinematic chain, comprising two forked guides pivotally carrying between their forked ends the said first-mentioned member, two parallel auxiliary shafts each pivotally carrying a forked guide at the middle portion of said forked guide, two driving shafts, a Cardan joint pivotally connecting each driving shaft with the corresponding auxiliary shaft, stationary means carrying each auxiliary shaft and each driving shaft to make each driving shaft form an angle of 45° with the axis of the corresponding auxiliary shaft, the pivotal axes at the ends of each auxiliary shaft associated with the guide and with the Cardan joint, respectively forming an angle which is the complement of the sloping angle formed by the Cardan plane defined by the axes of the cooperating driving and auxiliary shafts, with the plane defined by the two parallel auxiliary shafts.

3. An arrangement for making a member execute a rotary and wobbling movement through a reversible kinematic chain, comprising two forked guides pivotally carrying between their forked ends the said first-mentioned member, two auxiliary shafts each pivotally carrying a forked guide at the middle portion of said forked guide, at least one driving shaft, a Cardan joint pivotally connecting each driving shaft with the corresponding auxiliary shaft, stationary means carrying each auxiliary shaft and each driving shaft to make each driving shaft form an angle of 45° with the axis of the corresponding auxiliary shaft, the pivotal axes at the ends of each auxiliary shaft associated with the guide and with the Cardan joint respectively forming an angle equal to 90° and the axes of all the shafts being coplanar.

4. An arrangement for making a member execute a rotary and wobbling movement through a reversible kinematic chain, comprising two forked guides pivotally carrying between their forked ends the said first-mentioned member, two parallel auxiliary shafts each pivotally carrying a forked guide at the middle portion of said forked guide, two driving shafts, a Cardan joint pivotally connecting each driving shaft with the corresponding auxiliary shaft, stationary means carrying each auxiliary shaft and each driving shaft to make each driving shaft form an angle of 45° with the axis of the corresponding auxiliary shaft, the pivotal axes at the ends of each auxiliary shaft associated with the guide and with the Cardan joint respectively forming an angle which is the complement of the sloping angle formed by the Cardan plane defined by the axes of the cooperating driving and auxiliary shafts, with the plane defined by the two parallel auxiliary shafts, and means for constraining said driving shafts to rotate in opposite directions and to drive positively said auxiliary shafts through the corresponding Cardan joints.

5. An arrangement for making a member execute a rotary and wobbling movement through a reversible kinematic chain comprising two forked guides pivotally carrying between their forked ends the said first-mentioned member, two parallel auxiliary shafts each pivotally carrying a forked guide at the middle portion of said forked guide, two driving shafts forming together a V, a Cardan joint pivotally connecting each driving shaft with the corresponding auxiliary shaft, stationary means carrying each auxiliary shaft and each driving shaft to make each driving shaft form an angle of 45° with the axis of the corresponding auxiliary shaft, the pivotal axes at the ends of each auxiliary shaft associated with the guide and with the Cardan joint respectively forming an angle which is the complement of the sloping angle formed by the Cardan plane defined by the axes of the cooperating driving and auxiliary shafts, with the plane defined by the two parallel auxiliary shafts, a common driving motor and a speed-reducing gear connected to one of said driving shafts through which said motor drives said auxiliary shafts through the corresponding Cardan joints.

6. An arrangement for making a member execute a rotary and wobbling movement through a reversible kinematic chain, comprising two forked guides pivotally carrying between their forked ends the said first-mentioned member, two parallel auxiliary shafts each pivotally carrying a forked guide at the middle portion of said forked guide, two parallel driving shafts, a Cardan joint pivotally connecting each driving shaft with the corresponding auxiliary shaft, stationary means carrying each auxiliary shaft and each driving shaft to make each driving shaft form an angle of 45° with the axis of the corresponding auxiliary shaft, the pivotal axes at the ends of each auxiliary shaft associated with the guide and with the Cardan joint respectively forming an angle which is the complement of the sloping angle formed by the Cardan plane defined by the axes of the cooperating driving and auxiliary shafts, with the plane defined by the two parallel auxiliary shafts, and separate driving means operatively connected with the corresponding driving shafts to drive said shafts at equal rotary speeds.

7. An arrangement for making a member execute a rotary and wobbling movement through a reversible kinematic chain, comprising two forked guides pivotally carrying between their forked ends the said first-mentioned member, two parallel auxiliary shafts each pivotally carrying a forked guide at the middle portion of said forked guide, at least one driving shaft, a Cardan joint pivotally connecting each driving shaft with the corresponding auxiliary shaft, stationary means carrying each auxiliary shaft and each driving shaft to make each driving shaft form an angle of 45° with the axis of the corresponding auxiliary shaft, the pivotal axes at the ends of each auxiliary shaft associated with the guide and with the Cardan joint respectively being parallel and the Cardan plane defined by the axes of each driving shaft and cooperating auxiliary shaft being perpendicular to the plane of the two auxiliary shafts.

8. An arrangement for making a member execute a rotary and wobbling movement through a reversible kinematic chain, comprising two forked guides pivotally carrying between their forked ends the said first-mentioned member, two parallel auxiliary shafts each pivotally carrying a forked guide at the middle portion of said forked guide, two driving shafts, a Cardan joint pivotally connecting each driving shaft with the corresponding auxiliary shaft, stationary means carrying each auxiliary shaft and each driving shaft to make each driving shaft form an angle of 45° with the axis of the corresponding auxiliary shaft, the pivotal axes at the ends of each auxiliary shaft associated with the guide and with the Cardan joint, respectively forming an angle which is the complement of the sloping angle formed by the Cardan plane defined by the axes of the cooperating driving and auxiliary shafts, with the plane defined by the two parallel auxiliary shafts, and a fly-wheel fitted over the end of one of the driving shafts remote from the cooperating Cardan joint.

References Cited in the file of this patent

UNITED STATES PATENTS

| | | |
|---|---|---|
| 2,302,804 | Schatz | Nov. 24, 1942 |
| 2,590,692 | Freudenstine | Mar. 25, 1952 |